US00RE34334E

United States Patent [19]

Chaney

[11] E Patent Number: Re. 34,334

[45] Reissued Date of Patent: Aug. 3, 1993

[54] CONVERTIBLE FAN ASSEMBLY

[75] Inventor: David B. Chaney, Powell, Ohio

[73] Assignee: The W. B. Marvin Manufacturing Company, Urbana, Ohio

[21] Appl. No.: 771,342

[22] Filed: Oct. 4, 1991

Related U.S. Patent Documents

Reissue of:

[64] Patent No.: 4,872,399
Issued: Oct. 10, 1989
Appl. No.: 232,340
Filed: Aug. 15, 1988

[51] Int. Cl.[5] ..... F24F 7/013
[52] U.S. Cl. ..... 454/210
[58] Field of Search ..... 454/203, 208, 209, 210

[56] References Cited

U.S. PATENT DOCUMENTS 2,456,340 12/1948 Tideman .
2,487,294 11/1949 Belter .
2,620,721 12/1952 Krauss .
2,658,441 11/1953 Johnson .
2,691,336 10/1954 Nash .
2,753,787 7/1956 Heiman .
2,805,820 9/1957 Evarts .
2,846,936 8/1958 Copeland .
2,862,657 12/1958 Copeland et al. .
2,925,026 2/1960 Schuster et al. .
3,019,718 2/1962 Macleod et al. .
4,123,197 10/1978 Keem et al. .
4,222,318 9/1980 Patton et al. .
4,341,151 7/1982 Sakamoto .
4,838,151 6/1989 Shin-Chin .

OTHER PUBLICATIONS

Copy of photograph of a Holmes Air Fan Mar. 1993.

*Primary Examiner*—Harold Joyce
*Attorney, Agent, or Firm*—Roger S. Dybvig

[57] ABSTRACT

An electric fan assembly for household use convertible between use in a window and use on a desk or floor has a substantially rectangular, one-piece, molded polypropylene support member formed from a first support panel, a second support panel, and a pair of living hinges connecting the first and second panels to one another along a pivot axis perpendicular to the top and bottom edges of the support member. The first support panel is constructed to provide a mounting for an electric fan motor, a venturi ring assembly including an intake grill, and an exhaust grill. In use, the two support panels may lie flat for use in a window or may be pivoted about the axis of the living hinges for use on a deck or floor. Extenders are provided for extending the effective width of said fan assembly for use in relatively wide windows and includes secondary extender plates connected to the extenders by lost motion for increasing the length of extension obtainable. The exhaust grill is optionally mounted for rotation.

27 Claims, 3 Drawing Sheets

FIG-1
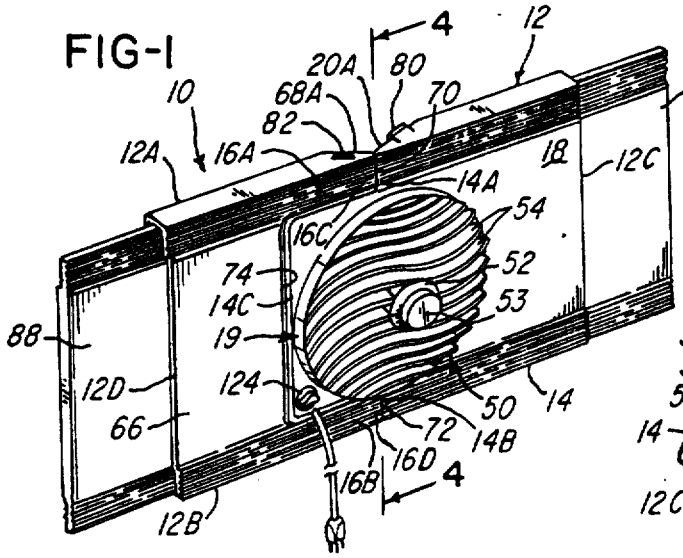
FIG-2
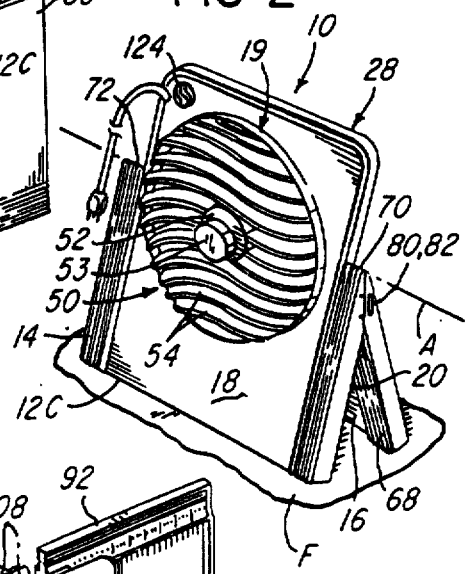
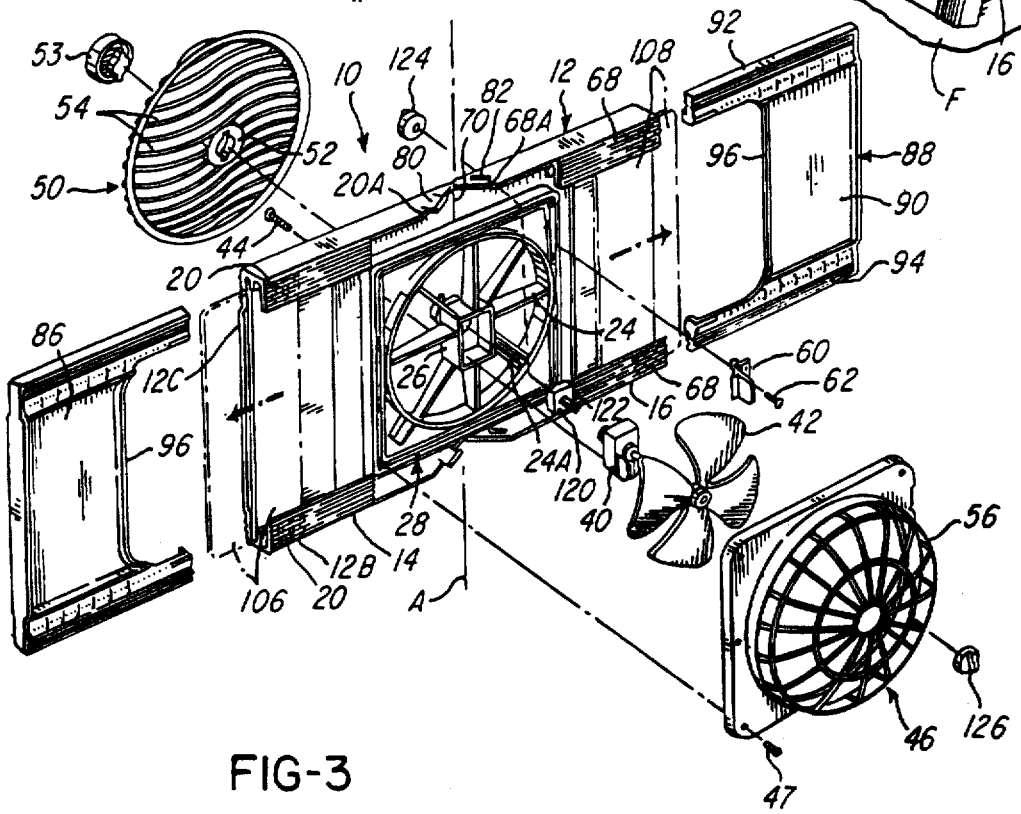
FIG-3

88
9
116
90
104
108
92
14
96
94
105
16
114
112
110
100
102
68
98
12
118
82
68A

CONVERTIBLE FAN ASSEMBLY

Matter enclosed in heavy brackets [ ] appears in the original patent but forms no part of this reissue specification; matter printed in italics indicates the additions made by reissue.

*This is an application for reissue of U.S. Pat. No. 4,872,399 granted Oct. 10, 1989, to David B. Chaney.*

SUMMARY OF THE INVENTION

This invention relates to a convertible fan assembly and more particularly to an electric fan assembly for household use that may be converted between use as in a window and use on a desk or floor.

Various convertible fan assemblies have been proposed or manufactured. These typically have a fan body and support members that are pivotally mounted relative to one another and to the fan body. However, the known convertible fan assemblies that have been proposed have a relatively complex construction and are therefore relatively costly to manufacture. Many would be difficult to convert from one use to another. Some employ relatively fragile parts and some involve the use of electric power cables that must be twisted, and thereby weakened, during use, or during conversion from use in a window to use on a desk or floor, or vice versa.

An object of this invention is to provide an improved convertible fan assembly that is rugged and inexpensive to manufacture and overcomes the disadvantages of prior convertible fan assemblies mentioned above.

In accordance with this invention, a fan assembly which may be readily converted between use as a window fan and use as a deck or floor fan comprises a substantially rectangular, one-piece, molded plastic, support member having a top edge, a bottom edge parallel to the top edge, and two mutually-spaced and mutually-parallel side edges. The support member comprises a first support panel, a second support panel, and a pair of living hinges connecting the first and second panels to one another along a pivot axis perpendicular to the top and bottom edges of the support member and parallel to and intermediate the side edges of the support member. The plastic of choice for manufacture of the support member is polypropylene because of its well-known advantage for use in forming parts having living hinges.

The first support panel is the larger of the two and has means mounting an electric fan theron, the fan comprising a venturi ring, an electric fan motor, a fan blade, an intake grill, and an exhaust grill. One of the above-mentioned living hinges extends from the fan to the upper edge of the support member and the other of the living hinges extends from fan to the lower edge of the support member.

Another object of this invention is to provide a convertible fan assembly that is small or compact for convenient use as a desk fan but may be adjustably extended, when used as a window fan, to cover various different windows having substantial differences in width. In this connection, it is an object of this invention to provide an improved extender assembly for use with window fans, and especially window fans which are convertible to desk or floor fans. To this end, the convertible fan assembly of this invention is provided with an extender assembly comprising a pair of primary extender plates which may be fully housed within, or covered by, the fan support panels and may be slidably extended outwardly of the sides of the support panels to cover parts of the width of the window in which the fan assembly is used that is not covered by the rest of the fan assembly. In order to be housed or covered by the support panels, the horizontal extent of the primary extender plates is limited by the dimensions of the support panels and by the venturi ring and grill mounting structure.

Further in accordance with this invention, the mutually confronting surfaces of the primary extender plates are cut away to avoid interference with the fan and its mounting means, but have upper and lower rails that extend respectively above and below the fan and its mounting means. In addition, secondary extender plates are provided for covering the cut-out portions of the primary extender plates which otherwise would be exposed to the sides of the support panels. Lost motion drive means in the form of interferring projecting surfaces on the primary and secondary extender plates are used appropriately to position the secondary extender plates as the primary plates are extended or retracted.

Other objects and advantages will become apparent from the drawings and the following description.

BRIEF DESCRIPTION OF THE DRAWINGS

FIG. 1 is perspective view of a convertible fan assembly made in accordance with this invention shown for use as a window fan.

FIG. 2 is perspective view of the convertible fan assembly of FIG. 1 shown for use as a floor fan.

FIG. 3 is an exploded, perspective view of the convertible fan assembly of FIG. 1.

DETAILED DESCRIPTION

Figure 4:
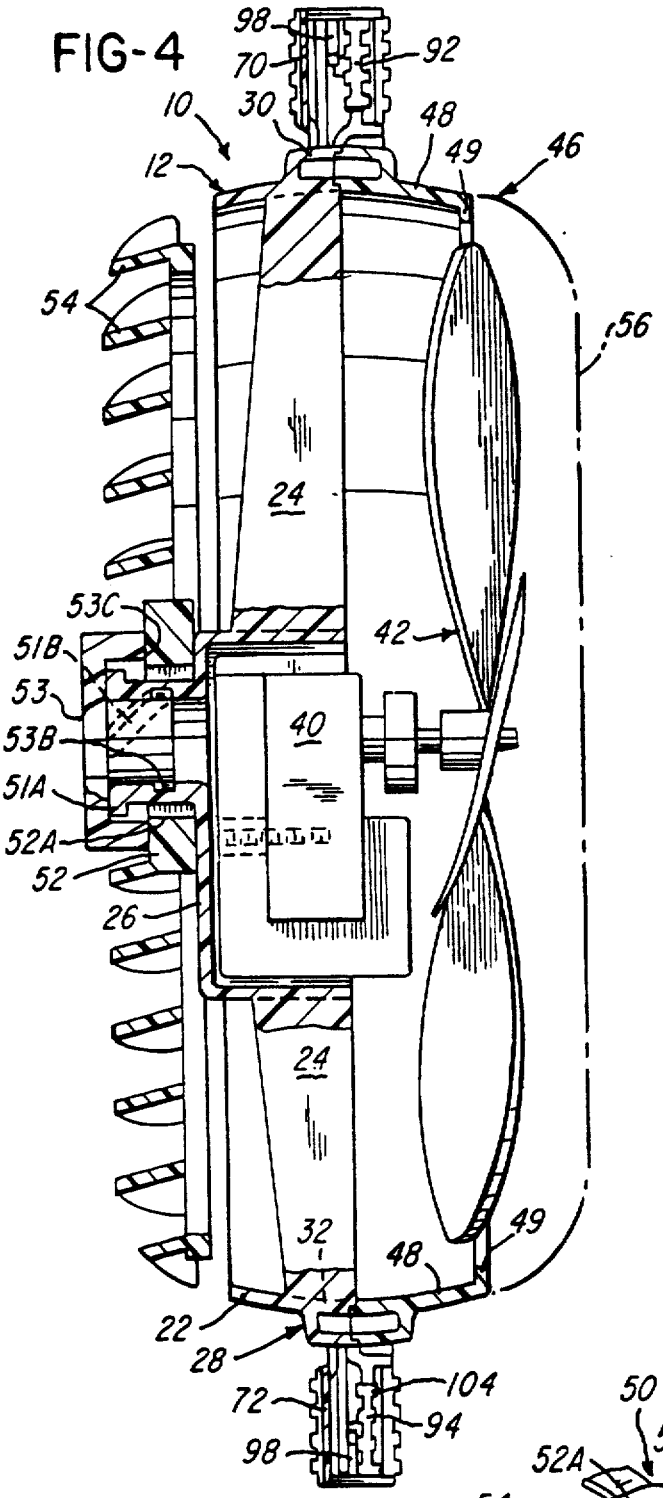
FIG. 4 is a cross-sectional view of the convertible fan assembly taken on line 4—4 of FIG. 1.

Referring to FIGS. 1 and 3, a convertible fan assembly of this invention, generally designated 10, comprises a one-piece, molded plastic, rectangular, fan support member, generally designated 12, having an upper edge 12A, a lower edge 12B parallel to the upper edge 12A, a right side (as viewed in FIG. 1) edge 12C, and a left side edge 12D parallel to the right side edge 12C. Support member 12 comprises a first, larger, thin-walled support panel 14 and a second, smaller, thin-walled support panel 16. Larger panel 14 is in the form of a plate having a front face 18 and mutually-confronting L-shaped flanges 20 (FIG. 3) along the upper and lower edges thereof.

Here it should be noted that positional terms such as front and rear, upper and lower, and right and left, are used herein for convenience in a relative sense and not in an absolute sense.

A fan, generally designated 19, is mounted on the larger panel 14. For this purpose, formed integrally with the larger panel 14 is a fan motor mounting ring 22 and a spider comprising plural spokes 24 extending radially inwardly from the fan mounting ring 22, and a motor housing 26 supported in the center of the fan mounting ring 22 by the spokes 24. The fan mounting ring 22 is surrounded by a rearwardly facing, substantially square, venturi ring mounting frame 28 formed by a pair of mutually closely-spaced ribs 30 and 32.

With reference to FIGS. 3 and 4, the motor housing 26 provides support for a fan drive motor assembly 40 that is adapted to drive a fan blade 42 and which is affixed to the motor housing 26 as by screws 44. A substantially square venturi ring assembly 46 is fixedly-mounted on the mounting frame 28 by plural screws 47, only one of which is shown in FIG. 3. The venturi ring assembly 46 includes a generally cylindrical outer wall 48 at the rear end of which is a venturi ring 49 surrounding the fan blade 42. An intake grill 56 which may be of conventional construction, is mounted in the venturi ring mounting assembly 46. Intake grill 56 may be formed by molding it in one piece with the venturi ring mounting assembly 46.

Figure 5:
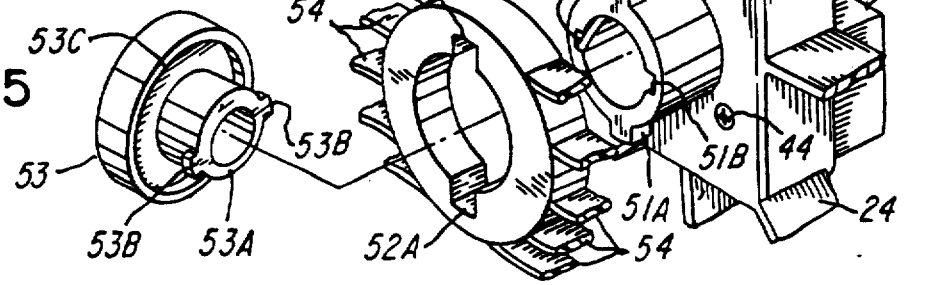
FIG. 5 is a fragmentary, exploded, perspective view of a portion of the fan assembly of FIG. 1 showing an exhaust grill mounting arrangement.
Figures 8, 9, 10:
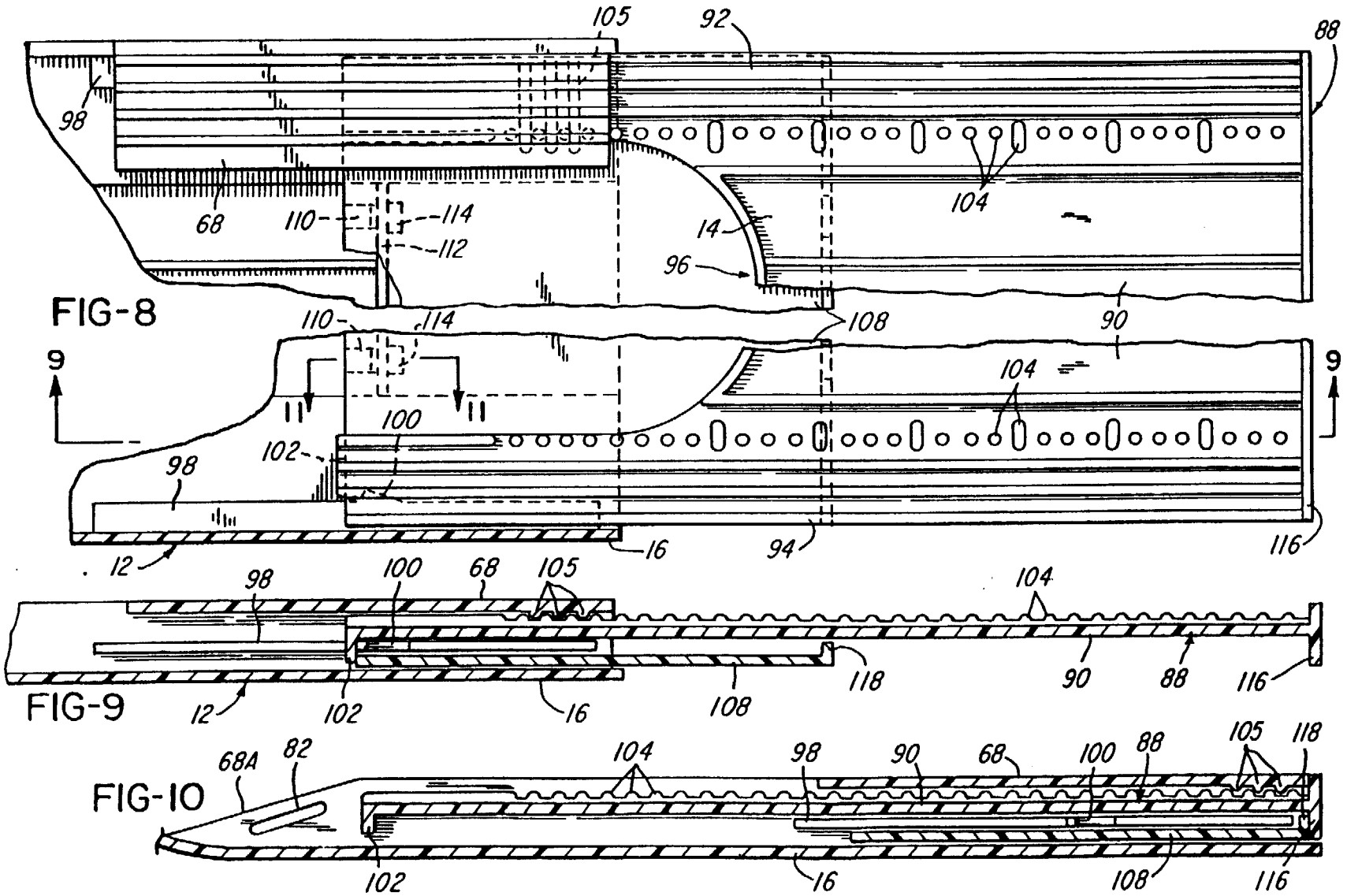
FIG. 8, on the third sheet of drawings, is a fragmentary elevational view of a portion of the fan assembly as viewed from the same direction as FIG. 3 and particularly illustrates parts of the extender assembly of this invention shown fully extended.
FIG. 9 is a fragmentary cross-sectional view taken on line 9—9 of FIG. 8.
FIG. 10 is a fragmentary cross-sectional view similar to FIG. 9, but showing parts of the extender assembly fully retracted.

Referring to FIGS. 4 and 5, a circular exhaust grill assembly 50 is mounted for rotation on a forwardly-extending hollow stub axle 51 formed integrally with the motor housing 26. The exhaust grill assembly 50 has a centrally-located hub 52 provided with a diametrically-opposed pair of internal grooves 52A adapted to slide over lugs 51A extending outwardly from the stub axle 51. A retaining and clamping knob 53 provided with a spindle 53A having outwardly-extending lugs 53B cooperates with the stub axle 51 to retain the grill assembly hub 52 and, accordingly, the entire grill assembly 50 on the stub axle 51. For this purpose, the internal wall of the stub axle 51 is provided with camming grooves 51B, which snugly receive the knob lugs 53B. The camming grooves 51B extend axially and circumferentially along the inner wall of the stub axle 51. During assembly, the hub 52 is slipped over the stub axle 51. Thereafter, the knob spindle 53A is inserted into the stub axle 51 with the knob lugs 53B being located in the camming grooves 51B. The knob spindle 53A is partly surrounded by a circular flange 53C that faces the exhaust grill assembly 50 in order to retain the exhaust grill assembly 50 on the stub axle 51.

If desired, the knob 53 may be rotated as permitted by the camming grooves 51B to axially move the knob 53 into a position wherein the exhaust grill hub 52 is nonrotatably clamped between the knob flange 53C and the front face of the motor housing 26. The exhaust grill assembly 50 preferably has louvers 54 that are at an angle of approximately 15 degrees relative to horizontal so that the exhaust grill assembly 50 may be clamped by rotation of the knob 53 in a position wherein it directs air to a selected portion of the area in which the fan assembly 10 is being used. It should be understood that the rotatable mounting of the exhaust grill 50 is optional; a fixedly-mounted exhaust grill (not shown) could be used instead.

Referring again to FIGS. 1 and 3, the smaller support panel 16 is of a generally rectangular construction and has a front face 66 and upper and lower, mutually confronting, L-shaped flanges 68. A pair of living hinges 70 and 72 connect the upper and lower edge portions, respectively, of the panels 14 and 16 and the smaller panel 16 has a substantially C-shaped cut-out region 74 adapted to receive the confronting portion of the venturi ring mounting frame 28. As is well known, living hinges, such as 70 and 72, are formed by thin-walled sections of suitable material, preferably polypropylene. The living hinges 70 and 72 form a pivot axis "A" perpendicular to the upper and lower support member edges 12A and 12B are located centrally between and parallel to the support member side edges 12C and 12D. The hinges 70 and 72 extend from the respective upper and lower edges of the venturi ring mounting frame 28 to the respectively-adjacent upper and lower support member edges 12A and 12B. The upper and lower arms, designated 16A and 16B, respectively, of the smaller panel 16 that form the top and bottom portions, respectively, of the C-shaped cut-out region 74 extend to the living hinges 70 and 72 so that the panels 14 and 16 may be pivoted relative to one another about the pivot axis "A." More particularly, the top and bottom portions 16A, 16B of the panel 16 have upper and lower inner side edge portions 16C, 16D thereon which extend along the pivot axis A. Also, the panel 14 has upper and lower inner side edge portions 14A, 14B which extend along the pivot axis A and confront the upper and lower inner side edge portions 16C, 16D of the panel 16. Further, the panel 14 has a middle extension portion 14C located between its upper and lower inner side edge portions 14A, 14B and extending beyond the latter and beyond the pivot axis A past the upper and lower inner side edge portions 16C, 16D of the panel 16 and into its cutout region 74. The upper and lower living hinges 70, 72 respectively connect the upper and lower inner side edge portions 14A, 16C and 14B, 16D of the panels 14, 16, permitting pivotal movement of the extension portion 14C of the panel 14 relative to the cutout region 74 of the panel 16 as the panel 14 is pivoted relative to the panel 16 about the pivot axis A. As seen in FIG. 1, the fan 19 is stationarily mounted exclusively on the panel 14 and its extension portion 14C and thus will move with it relative to the panel 16. Thus, the panels 14 and 16 may selectively be oriented with their front faces 18 and 66 in a coplanar position as shown in FIG. 51, for use of the fan assembly 10 in a window, or oriented, as shown in FIG. 2, with the panels 14 and 16 at an acute included angle with respect to one another for use of the fan assembly 10 on a desk or floor, in which event the support member side edges 12C and 12D engage a support surface F. However, the fan 19 remains stationary with respect to the panel 14 and its extension portion 14C in both flat and folded orientations of the panels 14, 16.

Figure 6:
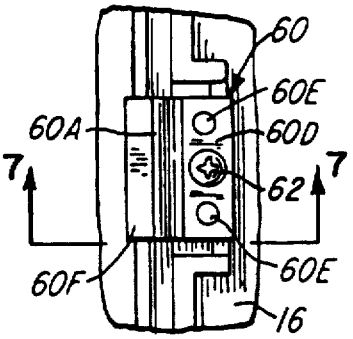
FIG. 6 is a fragmentary elevational view of a portion of the fan assembly of FIG. 1 showing a latch arrangement.
Figure 7:
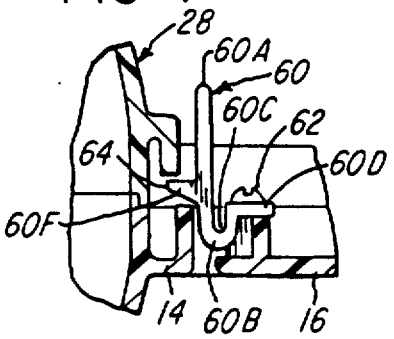
FIG. 7 is a fragmentary cross-sectional view taken along line 7—7 of FIG. 6.
Figure 11:
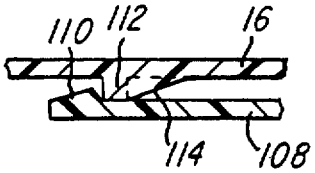
FIG. 11, on the second sheet of drawings, is a fragmentary cross-sectional view taken on line 11—11 of FIG. 8.

With reference of FIG. 3, the panels 14 and 16 may be held in their mutually coplanar relationship for use of the fan assembly 10 in a window by a pair of manually-operable clips 60 mounted on the smaller panel 16. As shown in FIGS. 6 and 7, each clip 60 comprises a generally J-shaped body comprising a longer leg 60A and a shorter leg 60B with a bight 60C between the two legs. A flange 60D extends from the shorter leg 60B and is connected to the smaller panel 16 as by a screw 62. The flange 60D may have apertures for receiving locating pins 60E extending from the smaller panel 16 to better secure the clip 60. When the support panels 14 and 16 are maintained in coplanar relation, an elongate wedge 60F projecting from the longer clip leg 60A enters a notch 64 provided for this purpose between the venturi ring mounting frame 28 and the venturi ring mounting assembly 46. As is deemed apparent, the wedge 60F will be self-biased by the clip 60 to enter the notch 64 when the panels 14 and 16 are moved into a mutually coplanar orientation so that the panels 14 and 16 will be locked to one another. To convert for use as a floor fan, one may simply manually grip the longer clip arms 60A to remove the wedges 60F from the notches 64.

To retain the acute angular orientation of the panels 14 and 16 shown in FIG. 2, the L-shaped flanges 20 may be provided with integrally-formed spring hooks 80 adapted to enter cooperating slots 82 in the L-shaped flanges 68. Here it may be noted that the confronting end portions, designated 20A and 68A, respectively, of the L-shaped flanges 20 and 68 slope rearwardly and outwardly away from the living hinges 70 and 72 so that they will not interfere with the pivoting of the panels 14 and 16 to their angular orientation shown in FIG. 2.

Referring again to FIGS. 1, and 3, the fan assembly 10 further includes a pair of extenders 86 and 88, one for each of the longer panel 14 and the shorter panel 16, respectively. These extenders are used, as is well known in the art, to extend the effective width of the fan assembly 10, when used in a window, to ensure that the entire width of the window is covered. The extender 86 and the manner in which it is slidably mounted may be substantially identical to the extender 88 and its related mounting arrangement. Therefore, only the extender 88 and its mounting arrangement is illustrated and described in detail herein. With reference also to FIGS. 8 through 11, the extender 88 comprises a generally rectangular panel 90 formed with an upper ribbed rail 92, a lower ribbed rail 94, and a substantially C-shaped cut out 96 for the fan mounting parts, in particular the venturi ring mounting frame 28. The rails 92 and 94 are not cut-away so that their inner ends, when the extenders are fully retracted, straddle, and thereby accommodate, the venturi ring mounting frame 28.

Located within each of the L-shaped flanges 20 and 68 is an elongate divider strip 98. The extender rails 92 and 94 of the extender 88 are slidably mounted between the rear walls of the L-shaped flanges 68 and the associated divider strips 98. Each divider strip 98 has a cam-like stop member 100 that cooperates with a stop tab or flange 102 projecting forwardly from the inner side edge of the extender 88. The stop members 100 are effective to permit assembly of the extender 88, at which time each stop tab 102 cams over the more gradually sloping surface of its associated stop member 100, but are also effective to prevent excessive outward movement of the extender 88 and thereby prevent easy or accidental disassembly of the extender 88 from the panel 16.

In use, the extender 88 is effectively housed behind the panel 16 when the extender 88 is retracted. It may be manually extended when desired by simply pulling it sideways out of the panel 16. Such movement is resisted, and effectively detented, by the frictional interference between a plurality of projections 104 on the rear face of the extender rails 92 and 94 and plural vertical ribs 105 located on the inside face of the rear legs of the L-shaped flange 68.

The extenders 86 and 88 may be moved outwardly to such an extent that the extender cut-out portions 96 would be exposed past the side edges 12C and 12D of the support member 12. So that the fan assembly 10 may still be optimally usable, a pair of secondary extender plates 106 and 108, respectively, are slideably mounted within the area defined between the rear faces of the panels 14 and 16 and the divider strips 98. The secondary extender plates 106 and 108 are normally housed behind the panels 14 and 16, but have a lost-motion connection to the extenders 86 and 88 so that they are extended to cover the opening that otherwise may be formed by the extension of the cut-out portions 96 past the sides of the panel 14 and 16. As the extender 88 is moved sideways to extend it from the position shown in FIG. 10 to that shown in FIG. 9, the stop flange or tab 102 engages the inner side edge of the secondary extender plate 108, causing it also to be extended. If the extender 88 is moved to the fully extended position shown in FIG. 9, further outward travel of the secondary extender plate 108 is prevented by engagement of a pair of hook-like stops 110 thereon with a rib 112 on the rear face of the support panel 16. Ramp or cam surfaces 114 may be provided adjacent the parts of the rib 112 engaged by the hook-like stops 110 to permit the parts to be assembled by camming over one another. Upon retraction of the extender 88, the secondary extender plate 108 is caused to return to its retracted position by engagement of a flange 116 on the outermost side edge of the extender plate 88 with the outer side edge 118 of the secondary extender plate 108. As should be apparent, the secondary extender plate 106 is moved by the extender 86 in the same manner described above for the movement of the secondary extender plate 108 by the extender 88.

From an electrical standpoint, the operation of the fan assembly may be entirely conventional. It is provided with a control switch 120 having a switch operating shaft 122 extending forwardly and rearwardly with front and rear operating knobs 124 and 126, respectively, operable from either front or rear of the fan assembly 10. The motor lead wire may extend through a spoke, designated 24A, modified for this purpose. Because the parts of the fan assembly 10 through which the motor and external leads extend are non-rotatable with respect to one another, there is no concern with regard to possible twisting of these leads.

Although the presently preferred embodiment of this invention has been disclosed, it will be understood that various changes may be made within the scope of the appended claims.

I claim:

1. A fan assembly convertible between use in a window and use on a desk or floor comprising:

a one-piece support member having a top edge, a bottom edge spaced from said top edge, and two mutually-spaced outer side edges, said support member comprising a first support panel, a second support panel, and a pair of living hinges connecting said first and second panels to one another along a pivot axis extending perpendicularly to said top and bottom edges and parallel to and intermediate said outer side edges of said support member; and a fan stationarily mounted on said first support panel;

one of said living hinges extending from said fan to said upper edge of said support member and the other of said living hinges extending along said pivot axis from said fan to said lower edge of said support member, said living hinges being constructed so that said first and second support panels of said support member may be pivoted about said pivot axis to a substantially flat orientation with respect to each other for use in a window or may optionally be pivoted about said pivot axis to a folded orientation with respect to each other for use on a deck or floor with both said outer side edges adapted to rest on a desk top or floor.

2. The fan assembly of claim 1 further comprising a pair of extenders, one for each of said panels, slidably connected to said panels for extending the effective width of said fan assembly for use in relatively wide windows.

3. The fan assembly of claim 2 wherein each of said panels has an upper flange extending along the upper edge thereof and a lower flange extending along the lower edge thereof and means connected to said flanges frictionally engaging said extenders.

4. The fan assembly of claim 2 further comprising a pair of secondary extender plates, one for each of said extenders, and lost motion means for causing said secondary extender plates to be extended and retracted during the latter stages of extension and retraction movements of said extenders.

5. The fan assembly of claim 1 wherein latch means are provided for holding said first panel and said second panel in said folded orientation for use on a desk or floor wherein said panels are at an acute relative angle.

6. The fan assembly of claim 5 wherein second latch means are provided for holding said first panel and said second panel in said flat orientation for use in a window wherein said panels are substantially coplanar.

7. The fan assembly of claim 1 wherein said fan includes an electric fan motor, a venturi ring, an intake grill and an exhaust grill, all of which are stationarily mounted on said first support panel.

8. A fan assembly convertible between use in a window and use on a desk or floor comprising:

a one-piece support member having a top edge, a bottom edge spaced from said top edge, and two mutually-spaced side edges, said support member comprising a first support panel, a second support panel, and a pair of living hinges connecting said first and second panels to one another along a pivot axis extending perpendicularly to said top and bottom edges and parallel to and intermediate said side edges of said support member;

a fan mounted on said first support panel of said support member;

one of said living hinges extending from said fan to said upper edge of said support member and the other of said living hinges extending from said fan to said lower edge of said support member and constructed so that said support member may be substantially flat for use in a window or may optionally be folded about said pivot axis for use on a desk or floor with both said side edges adapted to rest on a desk top or floor;

a pair of extenders, one for each of said panels, slidably connected to said panels for extending the effective width of said fan assembly for use in relatively wide windows; and a pair of secondary extender plates, one for each of said extenders, and lost motion means for causing said secondary extender plates to be extended and retracted during the latter stages of extension and retraction movements of said extenders.

9. The fan assembly of claim 8 wherein each of said panels has an upper flange extending along the upper edge thereof and a lower flange extending along the lower edge thereof and means connected to said flanges frictionally engaging said extenders.

10. The fan assembly of claim 8 wherein latch means are provided for holding said first panel and said second panel in said folded orientation for use on a desk or floor wherein said panels are at an acute relative angle.

11. The fan assembly of claim 10 wherein second latch means are provided for holding said first panel and said second panel in said flat orientation for use in a window wherein said panels are substantially coplanar.

12. The fan assembly of claim 8 wherein said fan includes an electric fan motor, a venturi ring, an intake grill and an exhaust grill.

13. A fan assembly convertible between use in a window and use on a desk or floor comprising:

a one-piece support member having a top edge, a bottom edge spaced from said top edge, and two mutually-shaped outer side edges, said support member comprising a first support panel, a second support panel, and a pair of living hinges connecting said first and second panels to one another along a pivot axis extending perpendicularly to said top and bottom edges and parallel to and intermediate said outer side edges of said support member, said second support panel having a cutout region defining mutually-spaced top and bottom portions with upper and lower inner side edge portions thereon which extend along said pivot axis, said first support panel having upper and lower inner side edge portions which extend along said pivot axis and confront said upper and lower inner side edge portions of said second support panel, said first support panel also having a middle extension portion located between said upper and lower inner side edge portions of said first support panel and extending beyond the latter and beyond said pivot axis past said upper and lower inner side edge portions of said second support panel and into said cutout region thereof; and a fan stationarily mounted on said first support panel and said middle extension portion thereof;

one of said living hinges connecting said upper inner side edge portions of said first and second support panels and extending along said pivot axis from said fan to said upper edge of said support member and the other of said living hinges connecting said lower inner side edge portions of said first and second support panels and extending along said pivot axis from said fan to said lower edge of said support member, said living hinges being constructed so that said first and second support panels of said support member may be pivoted about said pivot axis to a substantially flat orientation with respect to each other for use in a window or may optionally be pivoted about said pivot axis to a folded orientation with respect to each other for use on a desk or floor with both said outer side edges adapted to rest on a desk top or floor.

14. The fan assembly of claim 13 further comprising a pair of extenders, one for each of said panels, slidably connected to said panels for extending the effective width of said fan assembly for use in relatively wide windows.

15. The fan assembly of claim 14 wherein each of said panels has an upper flange extending along the upper edge thereof and a lower flange extending along the lower edge thereof and means connected to said flanges frictionally engaging said extenders.

16. The fan assembly of claim 14 further comprising a pair of secondary extender plates, one for each of said extenders, and lost motion means for causing said secondary extender plates to be extended and retracted during the latter stages of extension and retraction movements of said extenders.

17. The fan assembly of claim 13 wherein latch means are provided for holding said first panel and said second panel in said folded orientation for use on a desk or floor wherein said panels are at an acute relative angle.

18. The fan assembly of claim 17 wherein second latch means are provided for holding said first panel and said second panel in a flat orientation for use in a window wherein said panels are substantially coplanar.

19. The fan assembly of claim 13 wherein said fan includes an electric fan motor, a venturi ring, an intake grill and an exhaust grill, all of which are stationarily mounted on said first support panel and said middle extension portion thereof of said support member.

*20. A fan assembly for use in a window comprising:*

*a support member having a top edge, a bottom edge spaced from said top edge, and two mutually-spaced outer side edges;*

*a fan mounted on said support member;*

*a pair of extenders at each side edge of said support member, said extenders being slidably connected to said support member for extending the effective width of said fan assembly for use in relatively wide windows, each of said extenders including a primary extender plate and a secondary extender plate;*

*said support member having an upper flange extending along its top edge and a lower flange extending along its bottom edge;*

*means connected to said flanges frictionally engaging said extenders; and,*

*lost motion means for causing said secondary extender plates to be extended and retracted during the latter stages of extension and retraction movements of said extenders.*

*21. A fan assembly according to claim 20 wherein each of said primary extender plates includes an upper rail and a lower rail essentially encompassing a circumferential portion of the fan when the extenders are retracted, said upper rail and said lower rail thereby providing a C-shaped cut out in each primary extender plate, said cut out extending beyond the associated outer side edge of the support member when the extenders are extended and the assembly is mounted in a relatively wide window, and said lost motion means being constructed to move said secondary extender plate outwardly beyond the outer side edges of the support member to cause the secondary extender plates to cover the cut outs when the primary extender plates are extended.*

*22. A fan assembly of claim 21 wherein said upper rail and said lower rail of each primary extender plate remain in contact with said upper flange and said lower flange of the support member for all positions of the associated extender plate.*

*23. A fan assembly of claim 20 wherein said primary extender plates and their associated secondary extender plates are independently slidable in said upper flange and said lower flange of said support member.*

*24. An extender assembly for a window fan assembly which includes a fan mounted in a support member having a top edge, a bottom edge spaced from said top edge and a pair of spaced outer side edges, said extender assembly comprising:*

*a primary extender plate slidably connected to said support member at one side edge for extending the effective width of said fan assembly and retractable within said support member when not extended therefrom, said primary extender plate including an upper rail and a lower rail essentially encompassing a circumferential portion of the fan when said primary extender plate is retracted within said support member, said upper rail and said lower rail providing a C-shaped cut out in said primary extender plate, which cut out extends outwardly of the adjacent side edge of the support member when said primary plate is extended,*

*a secondary extender plate for covering said C-shaped cut out when said primary extender plate is extended, said secondary extender plate having a height of essentially the distance between said rails and a width generally the distance between said side edge and said fan, and*

*lost motion means for causing said secondary extender plate to be extended and retracted during the latter stages of extension and retraction movements of said primary extender plate.*

*25. The invention according to claim 24 wherein a pair of extender assemblies are provided, one at each side edge of said support member, each of said primary extender plates having a C-shaped cut out in the other of said primary extender plates and each of said primary extender plates having an associated secondary plate movable therewith during said extension and retraction movements.*

*26. The extender assembly of claim 24 wherein said primary extender plate is in frictional engagement with said support member.*

*27. The extender assembly of claim 24 wherein said lost motion means includes a stop tab on said primary extender plate for engaging said secondary extender plate when the primary extender plate is extended.*

* * * * *

UNITED STATES PATENT AND TRADEMARK OFFICE

CERTIFICATE OF CORRECTION

PATENT NO. : Re. 34,334
DATED : August 3, 1993
INVENTOR(S) : David B. Chaney

It is certified that error appears in the above-indentified patent and that said Letters Patent is hereby corrected as shown below:

On the title page, in the thirteenth line following the heading "ABSTRACT" the phrase "a deck" should read --a desk--.

Column 1, line 36, application column 1, line 28, "deck" should read --desk--.

Column 4, line 16, application column 4, line 7, "are" should read --and--.

Column 4, line 50, application column 4, line 41, "FIG. 51" should read --FIG. 1--.

Column 7, line 9, Claim 1, application claim 1, column 8, line 1 "deck" should read --desk--.

Signed and Sealed this

Sixteenth Day of July, 1996

Bruce Lehman

*Attest:*

BRUCE LEHMAN

*Attesting Officer*

*Commissioner of Patents and Trademarks*